(12) United States Patent
Miyazaki et al.

(10) Patent No.: US 7,094,174 B2
(45) Date of Patent: Aug. 22, 2006

(54) AUTOMATIC TRANSMISSION

(75) Inventors: Terufumi Miyazaki, Toyota (JP);
 Yoshihiro Iijima, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 146 days.

(21) Appl. No.: 10/281,958

(22) Filed: Oct. 29, 2002

(65) Prior Publication Data

US 2003/0083172 A1 May 1, 2003

(30) Foreign Application Priority Data

Oct. 30, 2001 (JP) ........................................ 2001-332179

(51) Int. Cl.
 *F16H 3/62* (2006.01)

(52) U.S. Cl. ...................... 475/324; 475/284; 475/323; 475/326

(58) Field of Classification Search ................ 475/275, 475/284, 285, 296, 323, 324, 326
 See application file for complete search history.

(56) References Cited

U.S. PATENT DOCUMENTS

| 6,422,969 | B1 | * | 7/2002 | Raghavan et al. | .......... 475/276 |
| 6,503,170 | B1 | * | 1/2003 | Tabata | ........................ 475/254 |
| 6,517,463 | B1 | * | 2/2003 | Sugiura et al. | .............. 475/287 |

FOREIGN PATENT DOCUMENTS

| EP | 0 434 525 A1 | 6/1991 |
|---|---|---|
| JP | 1-316552 | 12/1989 |
| JP | 2-107852 | 4/1990 |
| JP | 2-118247 | 5/1990 |
| JP | 4-140540 | 5/1992 |
| JP | 4-219553 | 8/1992 |
| JP | 405026310 | * 2/1993 ................. 475/280 |
| JP | 8-105496 | 4/1996 |
| JP | 9-126283 | 5/1997 |
| JP | 2956173 | 7/1999 |
| JP | 2000-199549 | 7/2000 |
| JP | 2000-240741 | 9/2000 |
| JP | 2000-266138 | 9/2000 |
| JP | 2000-274499 | 10/2000 |
| JP | 2001-82555 | 3/2001 |
| JP | 2001-182785 | 7/2001 |

\* cited by examiner

*Primary Examiner*—Ha Ho
(74) *Attorney, Agent, or Firm*—Oblon, Spivak, McClelland, Maier & Neustadt, P.C.

(57) ABSTRACT

An automatic transmission of a motor vehicle includes a first rotating element provided by coupling sun gears of a first planetary gear set and a second planetary gear set to each other, a second rotating element provided by coupling carriers of the first and second planetary gear sets to each other, a third rotating element provided by a ring gear of the first planetary gear set, and a fourth rotating element provided by a ring gear of the second planetary gear set. The first rotating element is selectively fixed to a transmission case by a first brake or coupled to an input shaft by a first clutch, and the second rotating element is selectively fixed to the case by a second brake or coupled to the input shaft by a second clutch. The fourth rotating element is coupled integrally to a ring gear of a third planetary gear set, and the third rotating element is coupled integrally to an output gear. With this arrangement, the automatic transmission establishes a selected one of the first-speed through sixth-speed gear stages and a reverse gear stage.

9 Claims, 4 Drawing Sheets

|  | CL1 | CL2 | B1 | B2 | B3 | F | GEAR RATIO | STEP |
|---|---|---|---|---|---|---|---|---|
| 1st |  |  |  | ◎ | ○ | ○ | 4.84 | 1.76 |
| 2nd |  |  | ○ |  | ○ |  | 2.75 | 1.53 |
| 3rd | ○ |  |  |  | ○ |  | 1.80 | 1.34 |
| 4th |  | ○ |  |  | ○ |  | 1.34 | 1.34 |
| 5th | ○ | ○ |  |  |  |  | 1.00 | 1.25 |
| 6th |  | ○ | ○ |  |  |  | 0.80 | TOTAL 6.05 |
| Rev | ○ |  |  | ○ |  |  | 4.00 |  |

AUTOMATIC TRANSMISSION

INCORPORATION BY REFERENCE

The disclosure of Japanese Patent Application No. 2001-332179 filed on Oct. 30, 2001 including the specification, drawings and abstract is incorporated herein by reference in its entirety.

BACKGROUND OF THE INVENTION

1. Field of the Invention

The invention relates to an automatic transmission of a motor vehicle, and more particularly to an automatic transmission capable of establishing a plurality of gear stages or speeds by using a reduced number of clutches.

2. Description of Related Art

Automatic transmissions of motor vehicles, each including a plurality of planetary gear sets, clutches and brakes, have been widely used. Japanese laid-open Patent Publication No. 2000-199549 discloses an example of such an automatic transmission which is able to establish six forward gear stages or speeds by using three planetary gear sets, three clutches and two brakes.

However, each of the clutches used in the automatic transmission requires a drum, seal rings, a mechanism for canceling a centrifugal oil pressure in a cylinder chamber, and other components, for enabling the clutch to be rotated. Thus, the weight and cost of clutches are generally greater than those of brakes, and the use of clutches is also disadvantageous in terms of the axial length of the transmission.

SUMMARY OF THE INVENTION

It is therefore an object of the invention to provide an automatic transmission capable of providing six forward gear stages or speeds by using two clutches.

To accomplish the above object, the invention provides an automatic transmission including (a) an input member, (b) an output member, (c) an auxiliary shift portion including a third planetary gear set having a sun gear, a carrier and a ring gear, a first one of which is coupled to the input member, a second one of which is selectively inhibited from rotating (caused to stop rotating) by a third brake, and a third one of which serves as an intermediate output member and is rotated at a reduced speed as compared with that of the input member to output power, and (d) a main shift portion including a first planetary gear set and a second planetary gear set each of which includes a sun gear, a carrier and a ring gear, at least one of the sun gear, the carrier and the ring gear of the first planetary gear set being coupled to at least one of the sun gear, the carrier and the ring gear of the second planetary gear set to provide a first rotating element, a second rotating element, a third rotating element and a fourth rotating element, which are arranged in the order of description from one end to the other end in a nomogram in which speeds of rotation of the first, second, third and fourth rotating elements are represented by straight lines, the main shift portion further including a first brake that selectively stops rotation of the first rotating element, a second brake that selectively stops rotation of the second rotating element, a first clutch that selectively couples the first rotating element to the input member, and a second clutch that selectively couples the second rotating element to the input member, the fourth rotating element being coupled integrally to the intermediate output member, the third rotating element being coupled integrally to the output member. In the automatic transmission, a first-speed gear stage having the largest gear ratio is established when the second brake and the third brake are engaged, a second-speed gear stage having a smaller gear ratio than that of the first-speed gear stage is established when the first brake and the third brake are engaged, a third-speed gear stage having a smaller gear ratio than that of the second-speed gear stage is established when the first clutch and the third brake are engaged, a fourth-speed gear stage having a smaller gear ratio than that of the third-speed gear stage is established when the second clutch and the third brake are engaged, a fifth-speed gear stage having a smaller gear ratio than that of the fourth-speed gear stage is established when the first clutch and the second clutch are engaged, and a sixth-speed gear stage having a smaller gear ratio than that of the fifth-speed gear stage is established when the second clutch and the first brake are engaged. The gear ratio mentioned above means the ratio of the speed of rotation of the input member to the speed of rotation of the output member (=rotation speed of the input member/rotation speed of the output member).

In one preferred embodiment of the invention as described above, (a) the first planetary gear set is a single pinion type, and the second planetary gear set is of a single pinion type, and (b) the first rotating element comprises the sun gear of the first planetary gear set and the sun gear of the second planetary gear set that are coupled to each other, the second rotating element comprises the carrier of the first planetary gear set and the carrier of the second planetary gear set, the third rotating element comprises the ring gear of the first planetary gear set, and the fourth rotating element comprises the ring gear of the second planetary gear set.

In another preferred embodiment of the invention, (a) the first planetary gear set is of a single pinion type, and the second planetary gear set is of a double pinion type, and (b) the first rotating element comprises the sun gear of the first planetary gear set, the second rotating element comprises the carrier of the first planetary gear set and the carrier of the second planetary gear set that are coupled to each other, the third rotating element comprises the ring gear of the first planetary gear set and the ring gear of the second planetary gear set that are coupled to each other, and the fourth rotating element comprises the sun gear of the second planetary gear set.

With the automatic transmission constructed as described above, six forward gear stages can be established by using three planetary gear sets, two clutches and three brakes. Thus, the weight, cost and the axial length of the transmission can be reduced as compared with the case where three clutches and two brakes are used, because of the reduction in the number of clutches.

In the above-described preferred embodiments, three planetary gear sets having relatively small sizes or diameters can be used, and the transmission gear ratios of the first-speed through sixth-speed gear stages can be set to appropriate values by suitably determining the gear ratios ρ of the three planetary gear sets. In the second preferred embodiment, the carriers and the ring gears of the single-pinion type first planetary gear set and the double-pinion type second planetary gear set are coupled to each other, namely, a common carrier and a common ring gear are used for the first and second planetary gear sets, so as to provide a Ravigneaux type planetary gear train. In this case, the number of components and the axial length of the transmission can be further reduced.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF PREFERRED EMBODIMENTS

Figures 1A, 1B:
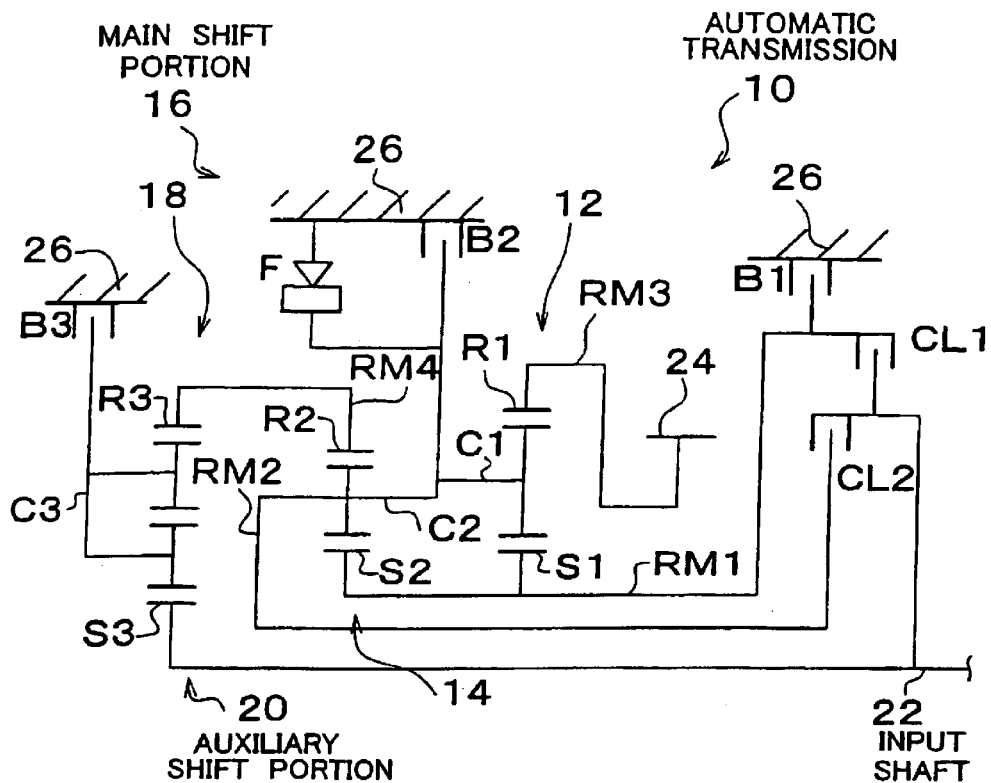
FIG. 1A is a schematic view showing an automatic transmission of a motor vehicle according to a first embodiment of the invention.
FIG. 1B is an operation table according to which each gear stage of the automatic transmission of the first embodiment as shown in FIG. 1A is established.

The invention is preferably applied to an automatic transmission of a motor vehicle, which receives rotary power from a driving power source, such as an internal combustion engine, via a fluid coupling such as a torque converter, changes the speed of rotation at a given gear ratio, and transmits the power from an output member, such as an output gear or an output shaft, to right and left driving wheels, via a differential gear unit. An input member of the transmission may be a turbine shaft of the torque converter, for example. It is to be understood that the invention may also be applied to automatic transmissions for use in systems other than motor vehicles.

The automatic transmission may be transversely or laterally installed on, for example, a front engine front drive (FF) vehicle, such that the axis of the transmission extends in the width direction of the vehicle, or may be longitudinally installed on, for example, a front engine rear drive (FR) vehicle, such that the axis of the transmission extends in the longitudinal or running direction of the vehicle.

The automatic transmission may automatically change its gear ratio or gear stage depending upon vehicle operating conditions, such as an accelerator pedal position and a vehicle speed, or may change its gear ratio in accordance with switching operations (e.g., upshifting and downshifting operations) by the vehicle operator or driver. The automatic transmission according to the invention is able to establish six forward gear stages, and also establish a reverse gear stage by engaging a first clutch and a second brake (which will be described later). While a third planetary gear set (which will be described later) that provides an auxiliary shift portion may be of a double pinion type or a single pinion type, a double-pinion type planetary gear set is preferably used for a reduction in the diameter of the gear set when the gear ratio of the auxiliary shift portion is set to about 0.5 so as to set the gear ratios of the transmission in geometric progression. More specifically, the double-pinion type third planetary gear set is constructed as described later such that a sun gear is coupled to and rotated by an input shaft of the transmission, and a carrier is selectively inhibited from rotating by a third brake (which will be described), while a ring gear, serving as an intermediate output member, is rotated at a reduced speed as compared with that of the input member, so as to output power. Alternatively, the double-pinion type planetary gear set is constructed such that the carrier is coupled to and rotated by the input shaft of the transmission, and the sun gear is selectively inhibited from rotating by the third brake, while the ring gear, serving as an intermediate output member, is rotated at a reduced speed as compared with that of the input member.

First through third brakes, first clutch and second clutch as described later may be preferably in the form of hydraulically operated friction devices of, for example, multiple-disc type, single-disc type or belt type, which are frictionally engaged by means of hydraulic cylinders. Other types of coupling devices, such as those of electromagnetic type, may also be used as the brakes and the clutches. A one-way clutch may be provided in parallel with the second brake. When an engine brake need not be applied, the one-way clutch may be provided in place of the second brake. Here, one-way clutches function, like brakes, to stop rotation of corresponding rotating members. Other than the above-described arrangements, the automatic transmission may be constructed in various ways. For example, a brake and a one-way clutch, which are coupled in series, may be provided in parallel with the first brake.

As describer later with respect to the second embodiment, a common carrier and a common ring gear are used for a first planetary gear set and a second planetary gear set, so as to provide a Ravigneaux type planetary gear train. Alternatively, carriers and ring gears of the first and second planetary gear sets are separately provided, and are coupled integrally to each other via coupling members, or the like.

A main shift portion is preferably constructed in the manner as described later with respect to the first embodiment or the second embodiment, but various other constructions or arrangements may also be employed. In one embodiment, for example, the first planetary gear set is of a double pinion type, and the second planetary gear set is of a single pinion type. In this embodiment, a sun gear of the second planetary gear set provides a first rotating element, and a sun gear of the first planetary gear set and a carrier of the second planetary gear set that are coupled to each other provide a second rotating element, while a ring gear of the first planetary gear set provides a third rotating element, and a carrier of the first planetary gear set and a ring gear of the second planetary gear set that are coupled to each other provide a fourth rotating element.

In another embodiment, the first planetary gear set is of a double pinion type, and the second planetary gear set is of a single pinion type. In this embodiment, a sun gear of the second planetary gear set provides a first rotating element, and a carrier of the first planetary gear set and a carrier of the second planetary gear set that are coupled to each other provide a second rotating element, while a ring gear of the first planetary gear set provides a third rotating element, and a sun gear of the first planetary gear set and a ring gear of the second planetary gear set that are coupled to each other provide a fourth rotating element.

In a further embodiment, the first planetary gear set is of a double pinion type, and the second planetary gear set is of a single pinion type. In this embodiment, a sun gear of the second planetary gear set provides a first rotating element, and a sun gear of the first planetary gear set and a carrier of the second planetary gear set that are coupled to each other provide a second rotating element, while a ring gear of the first planetary gear set and a ring gear of the second planetary gear set that are coupled to each other provide a third rotating element, and a carrier of the first planetary gear set provides a fourth rotating element.

The positional relationship between the main shift portion and the auxiliary shift portion and the positional relationship between the first planetary gear set and the second planetary gear set of the main shift portion are not limited to those of the following embodiments, but may be changed as needed. For example, the first planetary gear set may be disposed between the third planetary gear set of the auxiliary shift portion and the second planetary gear set.

Some exemplary embodiments of the invention will be described in greater detail with reference to the accompanying drawings. FIG. 1A schematically shows an automatic transmission 10 of a motor vehicle according to the first embodiment of the invention, and FIG. 1B is an operation table useful for explaining the relationship between engaging elements and gear ratios when a plurality of gear stages of the transmission are established. The automatic transmission 10 is mounted in the lateral direction in a vehicle, such as a FF vehicle, and includes a main shift portion 16 and an auxiliary shift portion 20. The main shift portion 16 mainly includes a single-pinion type first planetary gear unit 12 and a single-pinion type second planetary gear unit 14., and the auxiliary shift portion 20 mainly includes a double-pinion type third planetary gear unit 18. The automatic transmission 10 thus constructed transmits rotary power from an input shaft 22 to an output gear 24 while changing the speed of rotation. The input shaft 22, which corresponds to the above-indicated input member, is a turbine shaft of a torque converter, or the like, which is rotated or driven by a driving source, such as an engine, for running the vehicle. The output shaft 24, which corresponds to the above-indicated output member, rotates right and left drive wheels via a differential gear unit. It is to be noted that the automatic transmission 10 is constructed substantially symmetrically with respect to the center line, and only the upper half of the transmission 10 is illustrated in FIG. 1A.

The third planetary gear set 18 that provides the auxiliary shift portion 20 has a sun gear S3, a carrier C3, and a ring gear R3. The sun gear S3 is coupled to and rotated by the input shaft 22, and the carrier C3 is fixed to a transmission case 26 via a third brake B3 to be inhibited from rotating, while the ring gear R3, serving as an intermediate output member, is rotated at a reduced speed as compared with that of the input shaft 22, to output power to the main shift portion 16. Each of the first and second planetary gear sets 12, 14 that provide the main shift portion 16 has a sun gear S1, S2, a carrier C1, C2, and a ring gear R1, R2. The first and second planetary gear sets 12, 14 provide four rotating elements RM1–RM4 by coupling parts of the gear sets to each other. More specifically, the sun gear S1 of the first planetary gear set 12 and the sun gear S2 of the second planetary gear set 14 that are coupled to each other provide a first rotating element RM1, and the carrier C1 of the first planetary gear set 12 and the carrier C2 of the second planetary gear set 14 that are coupled to each other provide a second rotating element RM2, and the ring gear R1 of the first planetary gear set 12 provides a third rotating element RM3, and the ring gear R2 of the second planetary gear set 14 provides a fourth rotating element RM4. The first rotating element RM1 (i.e., sun gears S1, S2) is selectively coupled to the case 26 by the first brake Bi so that its rotation is stopped as needed, and the second rotating element RM2 (i.e., carriers C1, C2) is selectively coupled to the case 26 by the second brake B2 so that its rotation is stopped as needed.

The first rotating element RM1 (i.e., sun gears S1, S2) is selectively coupled to the input shaft 22 via the first clutch CL1, and the second rotating element RM2 (i.e., carriers C1, C2) is selectively coupled to the input shaft 22 via the second clutch CL2. The fourth rotating element RM4 (i.e., ring gear R2) is coupled integrally to the ring gear R3 (serving as an intermediate output member) of the third planetary gear unit 18, and the third rotating element RM3 (i.e., ring gear R1) is coupled integrally to the output gear 24 so as to output power. Each of the first through third brakes B1–B3, the first clutch CL1, and the second clutch CL2 is a hydraulically operated friction device of a multiple-disc type, which is frictionally engaged by means of a hydraulic cylinder. In addition, a one-way clutch F is disposed in parallel with the second brake B2, between the second rotating element RM2 and the case 26. The one-way clutch F is adapted to allow the second rotating element RM2 to rotate in the same direction as the input shaft 22, but inhibit the same element RM2 from rotating in the reverse direction.

Figure 2:
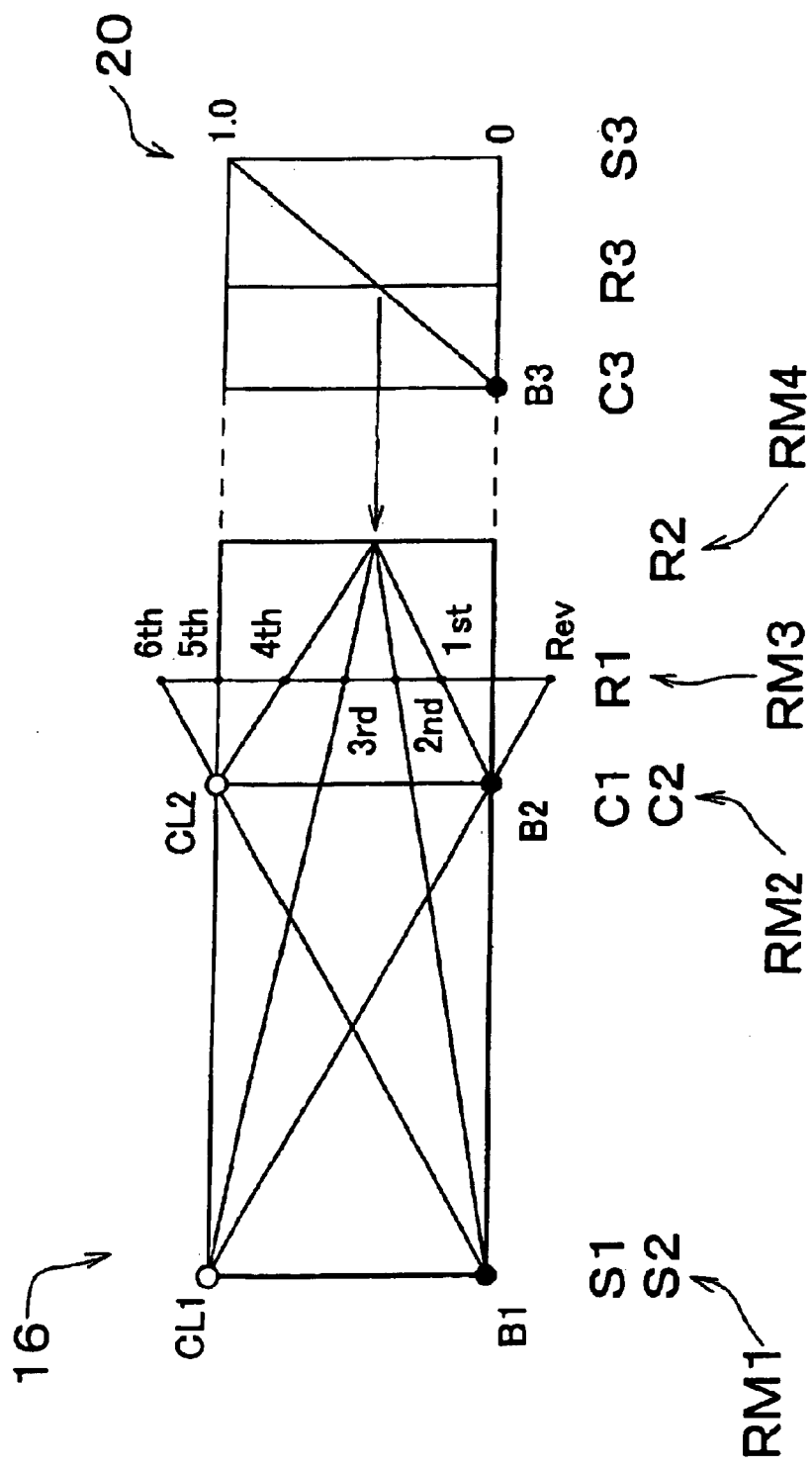
FIG. 2 is a nomogram plotted with respect to the automatic transmission of the first embodiment.

FIG. 2 is a nomogram in which straight lines represent the speeds of rotation of the respective rotating elements of the main shift portion 16 and the auxiliary shift portion 20. In the nomogram of FIG. 2, the lower horizontal line indicates rotation speed "0", and the upper horizontal line indicates rotation speed "1.0" which is equal to the rotation speed of the input shaft 22. Four vertical lines in the section of the main shift portion 16 respectively represent the first rotating element RM1 (i.e., sun gears S1, S2), the second rotating element RM2 (i.e., carriers C1, C2), the third rotating element RM3 (i.e., ring gear R1), and the fourth rotating element RM4 (i.e., ring gear R2) as viewed from the left to the right in FIG. 2. The intervals of these vertical lines are determined in accordance with the gear ratio $\rho 1$ (=the number of teeth of the sun gear/the number of teeth of the ring gear) of the first planetary gear set 12 and the gear ratio $\rho 2$ of the second planetary gear set 14. Three vertical lines in the section of the auxiliary shift portion 20 respectively represent the carrier C3, the ring gear R3 and the sun gear S3 as viewed from the left to the right in FIG. 2. The intervals of these vertical lines are determined in accordance with the gear ratio $\rho 3$ of the third planetary gear set 18.

As is apparent from the nomogram of FIG. 2, when the second brake B2 and the third brake B3 are engaged, and rotation of the second rotating element RM2 is stopped while the fourth rotating element RM4 is rotated at a reduced speed via the auxiliary shift portion 20, the third rotating element RM3 coupled to the output gear 24 is rotated at a speed denoted by "$1^{st}$" in FIG. 2, so that the first-speed gear stage having the largest gear ratio is established. When the first brake B1 and the third brake B3 are engaged, and rotation of the first rotating element RM1 is stopped while the fourth rotating element RM4 is rotated at a reduced speed via the auxiliary shift portion 20, the third rotating element RM3 is rotated at a speed denoted by "$2^{nd}$" in FIG. 2, so that the second-speed gear stage having a smaller gear ratio than that of the first-speed gear stage is established. When the first clutch CL1 and the third brake B3 are engaged, and the first rotating element RM1 is rotated as a unit with the input shaft 22 while the fourth rotating element RM4 is rotated at a reduced speed via the auxiliary shift portion 20, the third rotating element RM3 is rotated at a speed denoted by "$3^{rd}$" in FIG. 2, so that the third-speed gear stage having a smaller gear ratio than that of the second-speed gear stage is established. When the second clutch CL2 and the third brake B3 are engaged, and the second rotating element RM2 is rotated as a unit with the input shaft 22 while the fourth rotating element RM4 is rotated at a reduced speed via the auxiliary shift portion 20, the third rotating element RM3 is rotated at a speed denoted by "$4^{th}$" in FIG. 2, so that the fourth-speed gear stage having a smaller gear ratio than that of the third-speed gear stage is established. When the first clutch CL1 and the second clutch CL2 are engaged, and the main shift portion 16 is rotated as a unit with the input shaft 22, the third rotating element RM3 is rotated at a speed denoted by "$5^{th}$" in FIG. 2, which is equal to the rotation speed of the input shaft 22, so that the fifth-speed gear stage having a smaller gear ratio than that of the fourth-speed gear stage is established. The transmission gear ratio is equal to 1 when the automatic transmission 10 is placed in the fifth-speed gear stage. When the second clutch CL2 and the first brake B1 are engaged, and the second rotating element RM2 is rotated as a unit with the input shaft 22 while rotation of the first rotating element RM1 is stopped, the third rotating element RM3 is rotated at a speed denoted by "$6^{th}$" in FIG. 2, so that the sixth-speed gear stage having a smaller gear ratio than that of the fifth-speed gear stage is established. When the first clutch CL1 and the second brake B2 are engaged, and the first rotating element RM1 is rotated as a unit with the input shaft 22 while rotation of the second rotating element RM2 is stopped, the third rotating element RM3 is rotated in the reverse direction at a speed denoted by "Rev" in FIG. 2, so that a reverse gear stage "Rev" is established.

The operation table of FIG. 1B indicates the relationship between the respective gear stages and the operating states of the clutches CL1, CL2 and the brakes B1–B3. In FIG. 1B, "○" indicates engagement, and "◎" indicates engagement only at the time of application of an engine brake. Since the one-way clutch F is provided in parallel with the second brake B2 for establishing the first-speed gear stage, the second brake B2 is not necessarily engaged when the vehicle is started (or accelerated), and the first-speed gear stage can be established only by engaging the third brake B3. The transmission gear ratios of the respective gear stages are suitably determined depending upon the respective gear ratios ρ1, ρ2 and ρ3 of the first, second and third planetary gear sets 12, 14 and 18. For example, if ρ1 is equal to about 0.25, ρ2 is equal to about 0.54, and ρ3 is equal to about 0.45, the gear ratios as indicated in FIG. 1B are provided while maintaining the sizes (i.e., diameters) of the first, second and third planetary gear sets 12, 14, 16 relatively small. As is understood from FIG. 1B, the step value of the gear ratios, namely, the ratio of the gear ratios of the adjacent gear stages, is generally appropriate, and the total width of the gear ratios, namely, the ratio of the largest gear ratio to the smallest gear ratio (=4.84/0.80) is a sufficiently large value (which is about 6.05). Thus, the automatic transmission 10 provides appropriate speed-change characteristics over the entire range of operation.

With the automatic transmission 10 of the embodiment, six forward gear stages are established by using three planetary gear sets 12, 14, 18, two clutches CL1, CL2 and three brakes B1–B3. Thus, the weight, cost and the axial length of the automatic transmission 10 are reduced as compared with the case where three clutches and two brakes are used, because of the reduction in the number of clutches.

Furthermore, the sun gear S1 of the first planetary gear set 12 and the sun gear S2 of the second planetary gear set 14 may be formed as an integral component, and the carrier C1 of the first planetary gear set 12 and the carrier C2 of the second planetary gear set 14 may be formed as an integral component, so that the number of components can be reduced, and the axial length of the transmission 10 can be further reduced.

Next, other exemplary embodiments of the invention will be described. In the following embodiments, the same reference numerals as used in the description of the first embodiment will be used to identify substantially the same components or elements, of which no detailed explanation will be provided.

Figure 3:
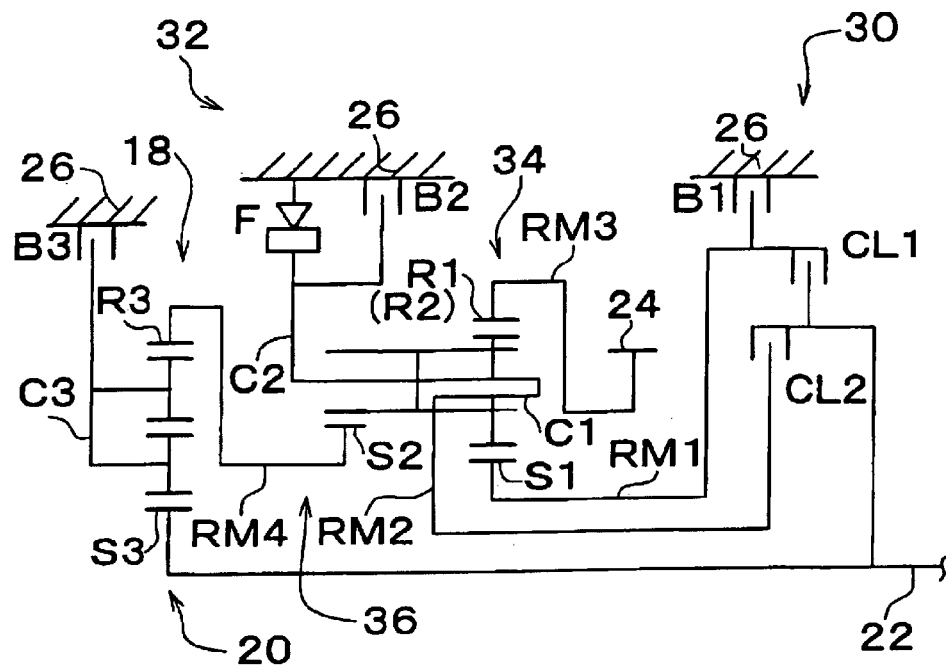
FIG. 3 is a schematic view, corresponding to that of FIG. 1A, showing an automatic transmission of a motor vehicle according to a second embodiment of the invention.

FIG. 3, which corresponds to FIG. 1A, schematically shows an automatic transmission 30 of a motor vehicle according to the second embodiment of the invention. The second embodiment is different from the first embodiment in the arrangement of a main shift portion 32. The main shift portion 32 mainly includes a single-pinion type first planetary gear unit 34 and a double-pinion type second planetary gear unit 36, and four rotating elements RM1–RM4 are provided by connecting parts of the first and second planetary gear sets 34, 36 with each other. More specifically, the sun gear S1 of the first planetary gear unit 34 provides the first rotating element RM1, and the carrier C1 of the first planetary gear set 34 and the carrier C2 of the second planetary gear set 36 are coupled to each other to provide the second rotating element RM2. The ring gear R1 of the first planetary gear set 34 and the ring gear R2 of the second planetary gear set 36 are coupled to each other to provide the third rotating element RM3, and the sun gear S2 of the second planetary gear set 36 provides the fourth rotating element RM4. In this embodiment, the automatic transmission 30 takes the form of a Ravigneaux type planetary gear train in which the carriers C1, C2 are formed as a common member, and the ring gears R1, R2 are also formed as a common member while a pinion gear of the first planetary gear set 34 also serves as a second pinion gear of the second planetary gear set 36.

The first through fourth rotating elements RM1–RM4 are coupled directly or selectively via brakes B1–B3 or clutches CL1, CL2, to corresponding members to provide the same coupling arrangement as that shown in FIG. 1A. The automatic transmission 30 thus constructed operates according to the nomogram as shown in FIG. 2 and the operation table as shown in FIG. 1B, so as to establish the first-speed through sixth-speed gear stages and one reverse gear stage. The transmission gear ratios of the respective gear stages are suitably determined depending upon the respective gear ratios ρ1, ρ2 and ρ3 of the first, second and third planetary gear sets 34, 36 and 18. For example, if ρ1 is equal to about 0.25, ρ2 is equal to about 0.46, and ρ3 is equal to about 0.45, the gear ratios as indicated in FIG. 1B are provided.

The automatic transmission 30 as described above is able to establish six forward gear stages or speeds by using two clutches CL1, CL2 and three brakes B1–B3, and therefore the weight, cost and the axial length of the transmission 30 can be advantageously reduced as in the first embodiment. In addition, since the single-pinion type first planetary gear unit 34 and the double-pinion type second planetary gear unit 36 provide the Ravigneaux type planetary gear train, the number of components and the axial length of the transmission 30 can be further reduced.

Figure 4:
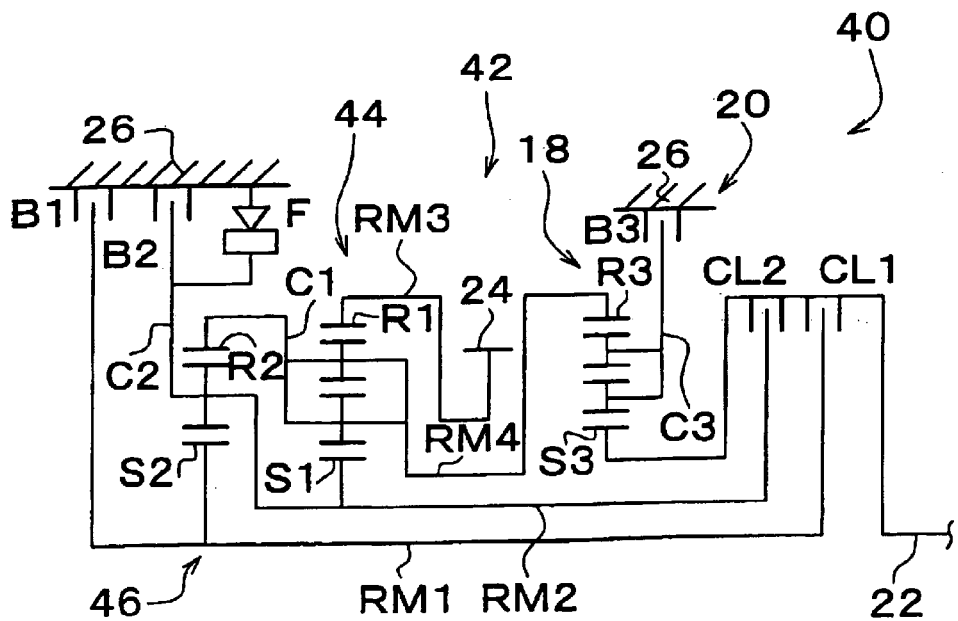
FIG. 4 is a schematic view, corresponding to that of FIG. 1A, showing an automatic transmission of a motor vehicle according to a third embodiment of the invention.

FIG. 4, which corresponds to FIG. 1A, schematically shows an automatic transmission 40 of a motor vehicle according to the third embodiment of the invention. The third embodiment is different from the previous embodiments in the arrangement of a main shift portion 42. The main shift portion 42 mainly includes a double-pinion type first planetary gear unit 44 and a single-pinion type second planetary gear unit 46, and four rotating elements RM1–RM4 are provided by connecting parts of the first and second planetary gear sets 44, 46 with each other. More specifically, the sun gear S2 of the second planetary gear unit 46 provides the first rotating element RM1, and the sun gear S1 of the first planetary gear set 44 and the carrier C2 of the second planetary gear set 46 are coupled to each other to provide the second rotating element RM2. The ring gear R1 of the first planetary gear set 44 provides the third rotating element RM3, and the carrier C1 of the first planetary gear set 44 and the ring gear R2 of the second planetary gear set 46 are coupled to each other to provide the fourth rotating element RM4.

The first through fourth rotating elements RM1–RM4 are coupled directly or selectively via brakes B1–B3 or clutches CL1, CL2, to corresponding members to provide the same coupling arrangement as that shown in FIG. 1A. The automatic transmission 40 thus constructed operates according to the nomogram as shown in FIG. 2 and the operation table as shown in FIG. 1B, so as to establish the first-speed through sixth-speed gear stages and one reverse gear stage. The transmission gear ratios of the respective gear stages are suitably determined depending upon the respective gear ratios $\rho 1$, $\rho 2$ and $\rho 3$ of the first, second and third planetary gear sets 44, 46 and 18.

The automatic transmission 40 as described above is able to establish six forward gear stages or speeds by using two clutches CL1, CL2 and three brakes B1–B3, and therefore the weight, cost and the axial length of the transmission 40 can be advantageously reduced as in the first and second embodiments.

Figure 5:
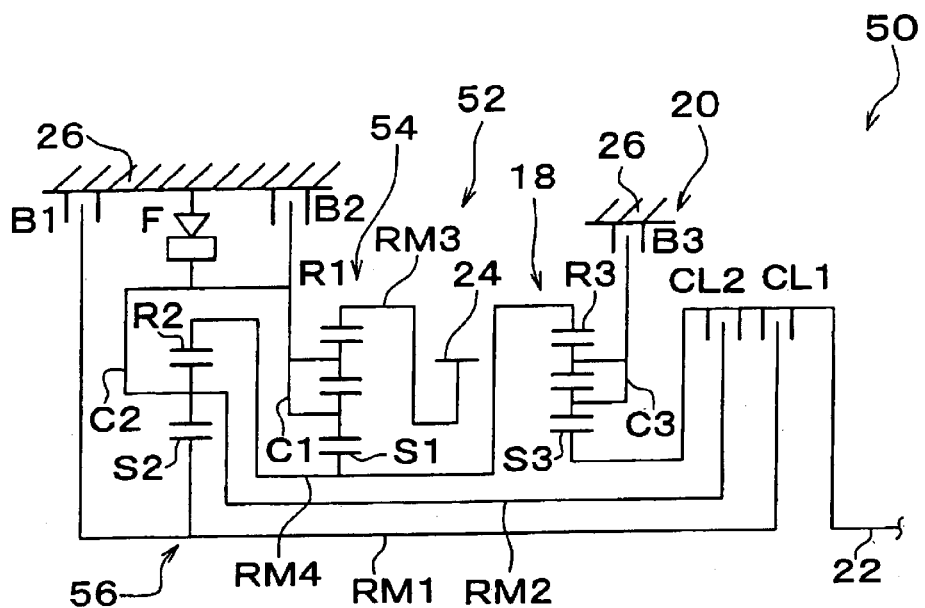
FIG. 5 is a schematic view, corresponding to that of FIG. 1A, showing an automatic transmission of a motor vehicle according to a fourth embodiment of the invention.

FIG. 5, which corresponds to FIG. 1A, schematically shows an automatic transmission 50 of a motor vehicle according to the fourth embodiment of the invention. The fourth embodiment is different from the previous embodiments in the arrangement of a main shift portion 52. The main shift portion 52 mainly includes a double-pinion type first planetary gear unit 54 and a single-pinion type second planetary gear unit 56, and four rotating elements RM1–RM4 are provided by connecting parts of the first and second planetary gear sets 54, 56 with each other. More specifically, the sun gear S2 of the second planetary gear unit 56 provides the first rotating element RM1, and the carrier C1 of the first planetary gear set 54 and the carrier C2 of the second planetary gear set 56 are coupled to each other to provide the second rotating element RM2. The ring gear R1 of the first planetary gear set 54 provides the third rotating element RM3, and the sun gear S1 of the first planetary gear set 54 and the ring gear R2 of the second planetary gear set 56 are coupled to each other to provide the fourth rotating element RM4.

The first through fourth rotating elements RM1–RM4 are coupled directly or selectively via brakes B1–B3 or clutches CL1, CL2, to corresponding members to provide the same coupling arrangement as that shown in FIG. 1A. The automatic transmission 50 thus constructed operates according to the nomoogram as shown in FIG. 2 and the operation table as shown in FIG. 1B, so as to establish the first-speed through sixth-speed gear stages and one reverse gear stage. The transmission gear ratios of the respective gear stages are suitably determined depending upon the respective gear ratios $\rho 1$, $\rho 2$ and $\rho 3$ of the first, second and third planetary gear sets 54, 56 and 18.

The automatic transmission 50 as described above is able to establish six forward gear stages or speeds by using two clutches CL1, CL2 and three brakes B1–B3, and therefore the weight, cost and the axial length of the transmission 50 can be advantageously reduced as in the previous embodiments.

Figure 6:
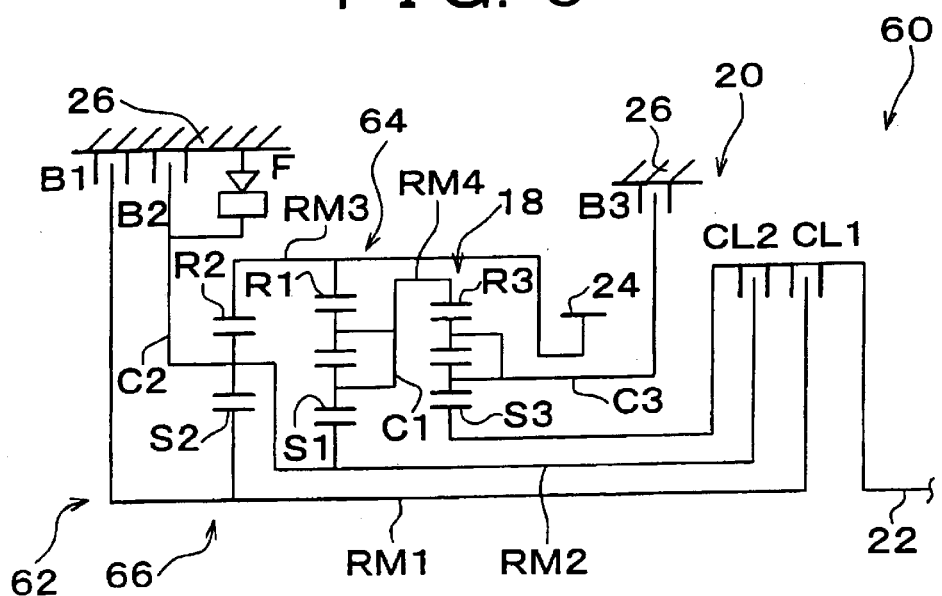
FIG. 6 is a schematic view, corresponding to that of FIG. 1A, showing an automatic transmission of a motor vehicle according to a fifth embodiment of the invention.

FIG. 6, which corresponds to FIG. 1A, schematically shows an automatic transmission 60 of a motor vehicle according to the fifth embodiment of the invention. The fifth embodiment is different from the previous embodiments in the arrangement of a main shift portion 62. The main shift portion 62 mainly includes a double-pinion type first planetary gear unit 64 and a single-pinion type second planetary gear unit 66, and four rotating elements RM1–RM4 are provided by connecting parts of the first and second planetary gear sets 64, 66 with each other. More specifically, the sun gear S2 of the second planetary gear unit 66 provides the first rotating element RM1, and the sun gear S1 of the first planetary gear set 64 and the carrier C2 of the second planetary gear set 66 are coupled to each other to provide the second rotating element RM2. The ring gear R1 of the first planetary gear set 64 and the ring gear R2 of the second planetary gear set 66 are coupled to each other to provide the third rotating element RM3, and the carrier C1 of the first planetary gear set 64 provides the fourth rotating element RM4.

The first through fourth rotating elements RM1–RM4 are coupled directly or selectively via brakes B1–B3 or clutches CL1, CL2, to corresponding members to provide the same coupling arrangement as that shown in FIG. 1A. The automatic transmission 60 thus constructed operates according to the nomogram as shown in FIG. 2 and the operation table as shown in FIG. 1B, so as to establish the first-speed through sixth-speed gear stages and one reverse gear stage. The transmission gear ratios of the respective gear stages are suitably determined depending upon the respective gear ratios $\rho 1$, $\rho 2$ and $\rho 3$ of the first, second and third planetary gear sets 64, 66 and 18.

The automatic transmission 60 as described above is able to establish six forward gear stages or speeds by using two clutches CL1, CL2 and three brakes B1–B3, and therefore the weight, cost and the axial length of the transmission 60 can be advantageously reduced as in the previous embodiments.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element are also within the spirit and scope of the invention.

What is claimed is:

1. An automatic transmission, comprising:
   an input member;
   an output member;
   an auxiliary shift portion including a third planetary gear set having a sun gear, a carrier and a ring gear, a first one of which is coupled to the input member, a second one of which is selectively inhibited from rotating by a third brake, and a third one of which serves the ring gear serving as an intermediate output member and being rotated at a reduced speed as compared with that of the input member to output power; and
   a main shift portion including a first planetary gear set and a second planetary gear set each of which includes a sun gear, a carrier and a ring gear, at least one of the sun gear, the carrier and the ring gear of the first planetary gear set being coupled to at least one of the sun gear, the carrier and the ring gear of the second planetary gear set to provide a first rotating element, a second rotating element, a third rotating element and a fourth rotating element, the main shift portion further including a first brake that selectively stops rotation of the first rotating element, a second brake that selectively stops rotation of the second rotating element, a first clutch that selectively couples the first rotating element to the input member, and a second clutch that selectively couples the second rotating element to the input member, the fourth rotating element being coupled integrally to the intermediate output member, the third rotating element being coupled integrally to the output member, wherein a first-speed gear stage having the largest gear ratio is established when the second brake and the third brake are engaged, a second-speed gear stage having a smaller gear ratio than that of the first-speed gear stage is established when the first brake and the third brake are engaged, a third-speed gear stage having a smaller gear ratio than that of the second-speed gear stage is established when the first clutch and the third brake are engaged, a fourth-speed gear stage having a smaller gear ratio than that of the third-speed gear stage is established when the second clutch and the third brake are engaged, a fifth-speed gear stage having a smaller gear ratio than that of the fourth-speed gear stage is established when the first clutch and the second clutch are engaged, and a sixth-speed gear stage having a smaller gear ratio than that of the fifth-speed gear stage is established when the second clutch and the first brake are engaged, wherein the first planetary gear set is of a single pinion, and the second planetary gear set is of a single pinion, and the first rotating element comprises the sun gear of the first planetary gear set and the sun gear of the second planetary gear set that are coupled to each other, the second rotating element comprises the carrier of the first planetary gear set and the carrier of the second planetary gear set, the third rotating element comprises the ring gear of the first planetary gear set, and the fourth rotating element comprises the ring gear of the second planetary gear set.

2. An automatic transmission, comprising:

an input member;

an output member;

an auxiliary shift portion including a third planetary gear set having a sun gear, a carrier and a ring gear, a first one of which is coupled to the input member, a second one of which is selectively inhibited from rotating by a third brake, and a third one of which serves the ring gear serving as an intermediate output member and being rotated at a reduced speed as compared with that of the input member to output power; and a main shift portion including a first planetary gear set and a second planetary gear set each of which includes a sun gear, a carrier and a ring gear, at least one of the sun gear, the carrier and the ring gear of the first planetary gear set being coupled to at least one of the sun gear, the carrier and the ring gear of the second planetary gear set to provide a first rotating element, a second rotating element, a third rotating element and a fourth rotating element, the main shift portion further including a first brake that selectively stops rotation of the first rotating element, a second brake that selectively stops rotation of the second rotating element, a first clutch that selectively couples the first rotating element to the input member, and a second clutch that selectively couples the second rotating element to the input member, the fourth rotating element being coupled integrally to the intermediate output member, the third rotating element being coupled integrally to the output member, wherein a first-speed gear stage having the largest gear ratio is established when the second brake and the third brake are engaged, a second-speed gear stage having a smaller gear ratio than that of the first-speed gear stage is established when the first brake and the third brake are engaged, a third-speed gear stage having a smaller gear ratio than that of the second-speed gear stage is established when the first clutch and the third brake are engaged, a fourth-speed gear stage having a smaller gear ratio than that of the third-speed gear stage is established when the second clutch and the third brake are engaged, a fifth-speed gear stage having a smaller gear ratio than that of the fourth-speed gear stage is established when the first clutch and the second clutch are engaged, and a sixth-speed gear stage having a smaller gear ratio than that of the fifth-speed gear stage is established when the second clutch and the first brake are engaged, wherein:

the first planetary gear set is of a single pinion, and the second planetary gear set is of a double pinion; and the first rotating element comprises the sun gear of the first planetary gear set, the second rotating element comprises the carrier of the first planetary gear set and the carrier of the second planetary gear set that are coupled to each other, the third rotating element comprises the ring gear of the first planetary gear set and the ring gear of the second planetary gear set that are coupled to each other, and the fourth rotating element comprises the sun gear of the second planetary gear set.

3. The automatic transmission according to claim 2, wherein the first planetary gear set and the second planetary gear set provide a Ravigneaux type planetary gear train in which the carriers of the first and second planetary gear sets are formed as a common carrier, and the ring gears of the first and second planetary gear sets are formed as a common ring gear.

4. An automatic transmission, comprising:

an input member;

an output member;

an auxiliary shift portion including a third planetary gear set having a sun gear, a carrier and a ring gear, a first one of which is coupled to the input member, a second one of which is selectively inhibited from rotating by a third brake, and a third one of which serves the ring gear serving as an intermediate output member and being rotated at a reduced speed as compared with that of the input member to output power; and a main shift portion including a first planetary gear set and a second planetary gear set each of which includes a sun gear, a carrier and a ring gear, at least one of the sun gear, the carrier and the ring gear of the first planetary gear set being coupled to at least one of the sun gear, the carrier and the ring gear of the second planetary gear set to provide a first rotating element, a second rotating element, a third rotating element and a fourth rotating element, the main shift portion further including a first brake that selectively stops rotation of the first rotating element, a second brake that selectively stops rotation of the second rotating element, a first clutch that selectively couples the first rotating element to the input member, and a second clutch that selectively couples the second rotating element to the input member, the fourth rotating element being coupled integrally to the intermediate output member, the third rotating element being coupled integrally to the output member, wherein a first-speed gear stage having the largest gear ratio is established when the second brake and the third brake are engaged, a second-speed gear stage having a smaller gear ratio than that of the first-speed gear stage is established when the first brake and the third brake are engaged, a third-speed gear stage having a smaller gear ratio than that of the second-speed gear stage is established when the first clutch and the third brake are engaged, a fourth-speed gear stage having a smaller near ratio than that of the third-speed gear stage is established when the second clutch and the third brake are engaged, a fifth-speed gear stage having a smaller gear ratio than that of the fourth-speed gear stage is established when the first clutch and the second clutch are engaged, and a sixth-speed gear stage having a smaller gear ratio than that of the fifth-speed gear stage is established when the second clutch and the first brake are engaged, wherein:

the first planetary gear set is of a double pinion, and the second planetary gear set is of a single pinion; and the first rotating element comprises the sun gear of the second planetary gear set, the second rotating element comprises the sun gear of the first planetary gear set and the carrier of the second planetary gear set that are coupled to each other, the third rotating element comprises the ring gear of the first planetary gear set, and the fourth rotating element comprises the carrier of the first planetary gear set and the ring gear of the second planetary gear set that are coupled to each other.

5. An automatic transmission, comprising:

an input member;

an output member;

an auxiliary shift portion including a third planetary gear set having a sun gear, a carrier and a ring gear, a first one of which is coupled to the input member, a second one of which is selectively inhibited from rotating by a third brake, and a third one of which serves the ring gear serving as an intermediate output member and being rotated at a reduced speed as compared with that of the input member to output power; and a main shift portion including a first planetary gear set and a second planetary gear set each of which includes a sun gear, a carrier and a ring gear, at least one of the sun gear, the carrier and the ring gear of the first planetary gear set being coupled to at least one of the sun gear, the carrier and the ring gear of the second planetary gear set to provide a first rotating element, a second rotating element, a third rotating element and a fourth rotating element, the main shift portion further including a first brake that selectively stops rotation of the first rotating element, a second brake that selectively stops rotation of the second rotating element, a first clutch that selectively couples the first rotating element to the input member, and a second clutch that selectively couples the second rotating element to the input member, the fourth rotating element being coupled integrally to the intermediate output member, the third rotating element being coupled integrally to the output member.

wherein a first-speed gear stage having the largest gear ratio is established when the second brake and the third brake are engaged, a second-speed gear stage having a smaller gear ratio than that of the first-speed gear stage is established when the first brake and the third brake are engaged, a third-speed gear stage having a smaller gear ratio than that of the second-speed gear stage is established when the first clutch and the third brake are engaged, a fourth-speed gear stage having a smaller gear ratio than that of the third-speed gear stage is established when the second clutch and the third brake are engaged, a fifth-speed gear stage having a smaller gear ratio than that of the fourth-speed gear stage is established when the first clutch and the second clutch are engaged, and a sixth-speed gear stage having a smaller gear ratio than that of the fifth-speed gear stage is established when the second clutch and the first brake are engaged, wherein:

the first planetary gear set is of a double pinion, and the second planetary gear set is of a single pinion; and the first rotating element comprises the sun gear of the second planetary gear set, the second rotating element comprises the carrier of the first planetary gear set and the carrier of the second planetary gear set that are coupled to each other, the third rotating element comprises the ring gear of the first planetary gear set, and the fourth rotating element comprises the sun gear of the first planetary gear set and the ring gear of the second planetary gear set that are coupled to each other.

6. An automatic transmission, comprising:

an input member;

an output member;

an auxiliary shift portion including a third planetary gear set having a sun gear, a carrier and a ring gear, a first one of which is coupled to the input member, a second one of which is selectively inhibited from rotating by a third brake, and a third one of which serves the ring gear serving as an intermediate output member and being rotated at a reduced speed as compared with that of the input member to output power; and a main shift portion including a first planetary gear set and a second planetary gear set each of which includes a sun gear, a carrier and a ring gear, at least one of the sun gear, the carrier and the ring gear of the first planetary gear set being coupled to at least one of the sun gear, the carrier and the ring gear of the second planetary gear set to provide a first rotating element, a second rotating element, a third rotating element and a fourth rotating element, the main shift portion further including a first brake that selectively stops rotation of the first rotating element, a second brake that selectively stops rotation of the second rotating element, a first clutch that selectively couples the first rotating element to the input member, and a second clutch that selectively couples the second rotating element to the input member, the fourth rotating element being coupled integrally to the intermediate output member, the third rotating element being coupled integrally to the output member, wherein a first-speed gear stage having the largest gear ratio is established when the second brake and the third brake are engaged, a second-speed gear stage having a smaller gear ratio than that of the first-speed near stage is established when the first brake and the third brake are engaged, a third-speed gear stage having a smaller gear ratio than that of the second-speed gear stage is established when the first clutch and the third brake are engaged, a fourth-speed gear stage having a smaller gear ratio than that of the third-speed gear stage is established when the second clutch and the third brake are engaged, a fifth-speed gear stage having a smaller gear ratio than that of the fourth-speed gear stage is established when the first clutch and the second clutch are engaged, and a sixth-speed near stage having a smaller gear ratio than that of the fifth-speed gear stage is established when the second clutch and the first brake are engaged wherein:

the first planetary gear set is of a double pinion, and the second planetary gear set is of a single pinion; and the first rotating element comprises the sun gear of the second planetary gear set, the second rotating element comprises the sun gear of the first planetary gear set and the carrier of the second planetary gear set that are coupled to each other, and the third rotating element comprises the ring gear of the first planetary gear set and the ring gear of the second planetary gear set that are coupled to each other, and the fourth rotating element comprises the carrier of the first planetary gear set.

7. An automatic transmission, comprising:

an input member;

an output member;

an auxiliary shift portion including a third planetary gear set having a sun gear, a carrier and a ring gear, a first one of which is coupled to the input member, a second one of which is selectively inhibited from rotating by a third brake, and a third one of which serves the ring gear serving as an intermediate output member and being rotated at a reduced speed as compared with that of the input member to output power; and a main shift portion including a first planetary gear set and a second planetary gear set each of which includes a sun gear, a carrier and a ring gear, at least one of the sun gear, the carrier and the ring gear of the first planetary gear set being coupled to at least one of the sun gear, the carrier and the ring gear of the second planetary gear set to provide a first rotating element, a second rotating element, a third rotating element and a fourth rotating element, the main shift portion further including a first brake that selectively stops rotation of the first rotating element, a second brake that selectively stops rotation of the second rotating element, a first clutch that selectively couples the first rotating element to the input member, and a second clutch that selectively couples the second rotating element to the input member, the fourth rotating element being coupled integrally to the intermediate output member, the third rotating element being coupled integrally to the output member.

wherein a first-speed gear stage having the largest near ratio is established when the second brake and the third brake are engaged, a second-speed gear stage having a smaller gear ratio than that of the first-speed gear stage is established when the first brake and the third brake are engaged, a third-speed gear stage having a smaller near ratio than that of the second-speed gear stage is established when the first clutch and the third brake are engaged, a fourth-speed gear stage having a smaller gear ratio than that of the third-speed gear stage is established when the second clutch and the third brake are engaged, a fifth-speed gear stage having a smaller gear ratio than that of the fourth-speed gear stage is established when the first clutch and the second clutch are engaged, and a sixth-speed gear stage having a smaller gear ratio than that of the fifth-speed gear stage is established when the second clutch and the first brake are engaged, wherein:

the third planetary gear set is of a double pinion; and the sun gear of the third planetary gear set is coupled to the input member, the carrier of the third planetary gear set is selectively inhibited from rotating by the third brake, and the ring gear of the third planetary gear set is rotated at a reduced speed as compared with that of the input member to output power.

8. An automatic transmission, comprising:

an input member;

an output member;

an auxiliary shift portion including a third planetary gear set having a sun gear, a carrier and a ring gear, a first one of which is coupled to the input member, a second one of which is selectively inhibited from rotating by a third brake, and a third one of which serves as an intermediate output member and is rotated at a reduced speed as compared with that of the input member to output power; and a main shift portion including a first planetary gear set and a second planetary gear set each of which includes a sun gear, a carrier and a ring gear, at least one of the sun gear, the carrier and the ring gear of the first planetary gear set being coupled to at least one of the sun gear, the carrier and the ring gear of the second planetary gear set to provide a first rotating element, a second rotating element, a third rotating element and a fourth rotating element, the main shift portion further including a first brake that selectively stops rotation of the first rotating element, a second brake that selectively stops rotation of the second rotating element, a first clutch that selectively couples the first rotating element to the input member, and a second clutch that selectively couples the second rotating element to the input member, the fourth rotating element being coupled integrally to the intermediate output member, the third rotating element being coupled integrally to the output member, wherein:

the first planetary gear set is of a single pinion planetary gear;

the second planetary gear set is of a single pinion planetary gear;

the first rotating element is the sun gear of the first planetary gear set and the sun gear of the second planetary gear set that are coupled to each other;

the second rotating element is the carrier of the first planetary gear set and the carrier of the second planetary gear set that are coupled to each other;

the third rotating element is the ring gear of the first planetary gear set; and the fourth rotating element is the ring gear of the second planetary gear set.

9. The automatic transmission according to claim 8, wherein:

the third planetary gear set is of a double pinion planetary gear; and the sun gear of the third planetary gear set is coupled to the input member, the carrier of the third planetary gear set is selectively inhibited from rotating by the third brake, and the ring gear of the third planetary gear set is rotated at a reduced speed as compared with that of the input member to output power.

* * * * *